3,439,555
CABLE APPARATUS
Raymond G. Rech, Swansea, Mass., assignor to Arens Controls Inc., Evanston, Ill., a corporation of Illinois
Filed May 3, 1967, Ser. No. 635,735
Int. Cl. F16c 1/16
U.S. Cl. 74—501      8 Claims

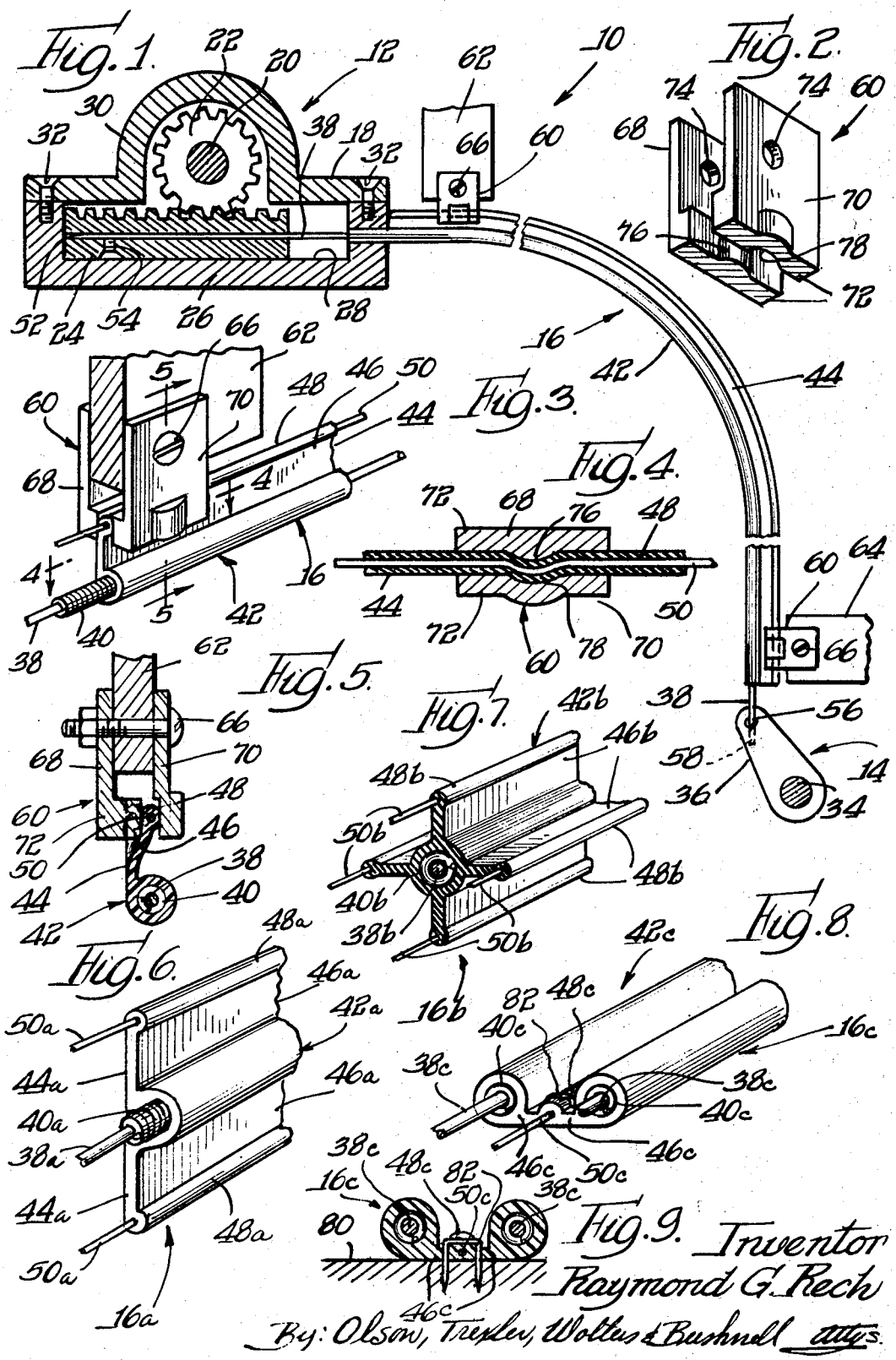

ABSTRACT OF THE DISCLOSURE

Motion-transmitting cable apparatus having a sheath with a permanently deformable, longitudinally extending, lateral projection which defines a continuous series of deformable clamping sites spaced from the motion-transmitting cable by a relatively thin web. The apparatus also includes a clamp-type mounting which engages the lateral projection in deformable relationship laterally away from the cable.

---

Bowden wire and other motion-transmitting cables are well known, and location of these cables against unwanted flapping movement is usually achieved by means of simple spring or screw clamps that are adapted to engage the cable sheath directly. However, the rigidity developed at the point of clamping renders the cable susceptible to kinking; and the types of clamps customarily employed have not always proved efficient.

Therefore, an important object of the present invention is to provide a device for transmitting mechanical motion which includes an oversheath having a lateral projection that defines a continuous series of deformable clamping sites away from the motion-transmitting cable.

A more general object of the invention is to provide new and improved apparatus for transmitting mechanical motion.

Another object of the invention is to provide a device for transmitting mechanical motion which is arranged for secure, non-rigid restraint along its entire length.

These and other objects and features of the invention will become more apparent from a consideration of the following descriptions.

In the drawing:

FIG. 1 is a schematic view of a control system incorporating a motion transmitting device in accord with the invention;

FIG. 2 is an enlarged perspective view of a clamp for use with the motion-transmitting device in the control system of FIG. 1;

FIG. 3 is an enlarged, perspective view showing the clamp of FIG. 2 mounting the motion-transmitting device to a structural element;

FIG. 4 is a further enlarged view taken substantially through the section 4—4 of FIG. 3;

FIG. 5 is a further enlarged view taken substantially through the section 5—5 of FIG. 3;

FIG. 6 is a perspective view of a first modified form of the motion-transmitting device of the inventioin;

FIG. 7 is a perspective view of a second modified form thereof;

FIG. 8 is a perspective view of a third modified form thereof; and

FIG. 9 is a transverse sectional view showing mounting of the device of FIG. 8 to a support structure.

Referring now in detail to the drawing, specifically to FIG. 1, a control system indicated generally by the reference numeral 10 is shown to include a proximate or operating station 12, a remote or controlled station 14, and cable apparatus 16 for transmitting rectilinear mechanical motions from the proximate station 12 to the remote station 14. The equipment at the proximate station 12 includes a control housing 18 that encloses one end of a control or operating shaft 20. A spur gear 22 is mounted on the end of shaft 20 within the housing 18, and gear 22 meshes with a reciprocable rack 24 in order to convert rotary motion to rectilinear motion or translation. The housing 18 itself comprises a base 26 that is fashioned with a guide cavity 28 for the rack 24, a centrally deflected cover 30 being attached to base 26, as by flat headed screws 32 for enclosing the spur gear 22 and providing a bearing for the shaft 20.

The equipment at remote station 14 includes a shaft 34 whose relative angular position is controlled by a radial arm 36 that is attached to the shaft 34 by means such as a collar, not shown.

Considering FIG. 3, the cable apparatus 16 includes an inner spring wire 38 which serves as the motion-transmitting element, an intermediate sheath 40 which serves as a bearing and guide for the wire 38, and an outer sheath 42. The intermediate sheath 40 may be fabricated as a coiled wire or as a resinous plastic tube, reinforced with wire or unreinforced as is desired; and in compliance with the features of the present invention, the outer sheath 42 is fabricated from flexible, deformable material and includes a longitudinally extending, lateral projection or flange 44 which is arranged to define a continuous series of clamping sites. The flange 44 specifically comprises a web 46 and a rib 48 that is located at the distal edge of the web. Advantageously, the sheath 42, including the component flange 44, comprises a suitable resinous plastic material extruded onto the sheath 40; and such materials as plasticized vinyl resins, polyolefins and various rubber compositions have proved useful in this regard. In compliance with a further feature of the invention, the rib 48 imbeds a longitudinally extending wire 40 of soft metal for purposes which will become more apparent hereinafter. The metal for wire 50 may be copper, aluminum alloys, soft iron or the like.

Returning to FIG. 1, the motion-transmitting cable wire 38 is shown mounted in a groove or bore 52 in the rack 24 by means of a set screw 54. Cooperatively, the opposite end of the cable wire 38 is secured to the radial arm 36 at an eccentric hole 56 by means of an L-shaped tip portion 58. In addition, medial portions of the cable apparatus 16 are immobilized by means of clamps 60 that are secured themselves to structural elements, such as the parts 62 and 64 with bolts 60.

Considering FIG. 2, a typical clamp 60 comprises a pair of leaves or blades 68 and 70 which are fashioned with respective anvil portions 72 for use in clamping the flange 44 of cable apparatus therebetween. The leaves 68 and 70 are perforated with alignable holes 74 for passing the cooperating bolt 66; and advantageously, the anvil portions 72 are provided with, respectively, a rib 76 and a mating recess 78. When the anvil portions 72 are drawn forcibly toward each other, as is shown in FIG. 4, the mating rib 76 and recess 78 deform the rib 48 and upset the imbedded wire 50 to lock the flange of the cable apparatus in place relative to the clamp 60. Other types of clamps may be used to advantage, and the rib 48 may be itself deformed sufficiently to form a firm location without need for upsetting the imbedded wire 50.

As is shown in FIG. 5, clamping of the flange 44 at the rib 48 allows the cable wire 38 and its associated sheaths a small degree of freedom for responding resiliently to accidental blows or other forces, thus resisting the tendency for the cable wire to kink under such circumstances. While it is presently preferred to mount the cable apparatus by a clamping deformation of the rib 48, a useful mounting of the cable apparatus may also be achieved by means of a blind rivet or the like penetrating the web 46. In this latter type of attachment, the wire 50 has been found to serve a reinforcing function.

From the foregoing descriptions of the embodiment of FIGS. 1–5, it will be apparent that the lateral projection established by the flange 44 defines a continuous series of deformable clamping sites spaced apart from the motion-transmitting cable wire 38. It will also be apparent that the rib 48 of the flange 44 insures secure positioning by means of a cooperating clamp, this secure positioning being accompanied by non-rigid restraint of the remainder of the cable apparatus. The control cable wire is also protected by the outer sheath formed over the intermediate sheath 40; and while one embodiment of the invention has been thus far described with reference to FIGS. 1–5, the invention is not limited thereto. Therefore and in order to enhance the understanding of the invention, modified embodiments are disclosed in FIGS. 6, 7 and 8–9. Since these latter embodiments incorporate elements similar to those found in the embodiment of FIGS. 1–5, like numerals have been used to designate like parts. In addition, the suffix letter $a$ has been used to distinguish those elements associated with the embodiment of FIG. 6, the suffix letter $b$ has been used to distinguish the elements associated with the embodiment of FIG. 7, and the suffix letter $c$ has been used to distinguish the elements associated with the embodiment of FIGS. 8 and 9.

The cable apparatus of FIG. 6 is characterized by the provision of an additional web 46a, an additional rib 48a and an additional wire 50a. The primary and additional structures in this regard being disposed in a planar or substantially diametric relationship in order to develop a mounting or clamping flange on opposite sides of the control cable. The double flanged cable apparatus 16a is susceptible to a very secure mounting to a support structure and, as a consequence, is capable of being employed as a tension control using a lighter gauge control cable than would be required if the flanged sheath were not utilized. The cable apparatus 16b of FIG. 7 is characterized by the provision of four such flanges arranged at ninety-degree arcuate intervals around the axis of the control cable.

In FIGS. 8 and 9, cable apparatus 16c includes an additional control cable attached to the rib 48c by an additional web 46c; and as is shown in FIG. 9, the cable apparatus 16c may be secured to an underlying structure 80 by means of a staple 82 penetrating the respective webs 46c and deformably engaging the rib 48c. Thus, for the purposes of the present application, the word "clamp" means, not only a grip such as afforded by the device 60, but also the grip achieved with an element such as the staple 82.

While particular embodiments of the invention have been shown and described, these disclosures are to be understood as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. In a device for transmitting mechanical motion, the combination comprising: an elongated sheath of flexible, deformable material including a first longitudinally extending portion adapted to house a motion-transmitting cable, a second longitudinally extending, permanenty deformable portion spaced apart laterally from said first portion and defining a continuous series of clamping sites, and a web portion of substantially thinner section than said first and second portions interconnecting said first and second portions; motion-transmitting cable means in said first portion; and clamp mounting means engaging said second portion in deformable relationship spaced apart from said first portion.

2. The combination according to claim 1 which further comprises a metallic wire in said second portion.

3. The combination according to claim 1 which further comprises at least one additional second, permanently deformable portion defining a second series of clamping sites and a second web portion of like section with said first web portion interconnecting said additional second portion and the remainder of said sheath.

4. The combination according to claim 3 which further comprises a metallic wire in said additional second portion.

5. The combination according to claim 3 wherein said second web portion connects said additional second portion to said first portion.

6. The combination according to claim 1 which further comprises an additional first portion and a second web portion of like section with said first web portion interconnecting said additional first portion and the remainder of said sheath.

7. The combination according to claim 6 which further comprises additional motion-transmitting cable means in said additional first portion.

8. The combination according to claim 6 wherein said second web portion connects said additional first portion to said second portion.

References Cited

UNITED STATES PATENTS

| 2,218,903 | 10/1940 | Bratz | 74—501 |
| 3,126,757 | 3/1964 | Cadwallader | 74—501 |
| 3,143,001 | 8/1964 | Chisholm et al. | 74—501 |

FOREIGN PATENTS

| 1,078,278 | 5/1954 | France. |

DONLEY J. STOCKING, *Primary Examiner.*

LEONARD H. GERIN, *Assistant Examiner.*

U.S. Cl. X.R.

74—108